United States Patent [19]

Borden

[11] Patent Number: 4,617,789
[45] Date of Patent: Oct. 21, 1986

[54] APPARATUS AND METHOD FOR FABRICATING MULTI-STRAND SUPERCONDUCTING CABLE

[75] Inventor: Albert R. Borden, El Cerrito, Calif.

[73] Assignee: The United States of America as represented by the United States Department of Energy, Washington, D.C.

[21] Appl. No.: 718,397

[22] Filed: Apr. 1, 1985

[51] Int. Cl.[4] .......................... D02G 3/36; D07B 1/06; H01L 39/24
[52] U.S. Cl. ............................................. 57/6; 29/599; 57/222; 72/137
[58] Field of Search .................. 57/3, 6, 10, 59, 200, 57/215, 216, 219, 220, 13; 174/15 S, 128 S; 29/599; 72/66, 137, 76

[56] References Cited

U.S. PATENT DOCUMENTS

| | | | |
|---|---|---|---|
| 2,072,284 | 3/1937 | Voorhees | 57/13 X |
| 2,188,755 | 1/1940 | Markuson | 57/6 |
| 2,421,268 | 5/1947 | Isenberg | 57/6 |
| 2,422,272 | 6/1947 | Viehweger | 72/137 X |
| 2,936,435 | 5/1960 | Buck | 29/599 |
| 3,058,867 | 10/1962 | Plummer et al. | 57/6 X |
| 3,444,684 | 5/1969 | Schoerner et al. | 57/9 |
| 3,448,569 | 6/1969 | Brown et al. | 57/15 |
| 3,457,718 | 7/1969 | Otto et al. | 57/9 |
| 3,486,146 | 12/1969 | Williams | 29/599 X |
| 3,492,803 | 2/1970 | Cannon et al. | 57/59 |
| 3,639,672 | 2/1972 | Kafka | 174/15 C |
| 3,680,604 | 8/1972 | Frohlich et al. | 140/92.1 |
| 3,699,647 | 10/1972 | Bidault et al. | 29/599 |
| 3,735,018 | 5/1973 | Griesinger | 174/15 S X |
| 3,934,395 | 1/1976 | Vryland | 57/13 |
| 3,955,348 | 5/1976 | Orlandi | 57/13 |
| 3,969,885 | 7/1976 | Anahara et al. | 57/59 X |
| 4,385,485 | 5/1983 | Yonechi | 57/13 |
| 4,529,837 | 7/1985 | Borden | 174/128 S |

FOREIGN PATENT DOCUMENTS

| | | | |
|---|---|---|---|
| 37544 | 10/1981 | European Pat. Off. | 29/599 |
| 139081 | 10/1979 | Japan | 29/599 |
| 157497 | 12/1979 | Japan | 29/599 |

Primary Examiner—Stuart S. Levy
Assistant Examiner—Joseph J. Hail, III
Attorney, Agent, or Firm—L. E. Carnahan; Roger S. Gaither; Judson R. Hightower

[57] ABSTRACT

Multi-strand superconducting cables adapted to be used, for example, to wind a magnet is fabricated by directing wire strands inwardly from spools disposed on the perimeter of a rotating disk and wrapping them diagonally around a tapered mandrel with a flattened cross-sectional shape with a core having a wedge-shaped channel. As the cable is pulled axially, flexibly coupled wedge-shaped pieces are continuously passed through the channel in the mandrel and inserted into the cable as an internal support therefor.

14 Claims, 2 Drawing Figures

APPARATUS AND METHOD FOR FABRICATING MULTI-STRAND SUPERCONDUCTING CABLE

The United States Government has rights in this invention pursuant to Contract No. DE-AC03-76SF0098 awarded by the U.S. Department of Energy.

FIELD OF THE INVENTION

The present invention relates to an improved method for fabricating multi-strand superconducting cable and an apparatus therefor.

BACKGROUND OF THE INVENTION

Superconducting cables are typically formed with many strands and wound around the round sections of magnet coil ends. When such cables are fabricated, therefore, consideration must be given to their bending flexibility and cross-section stability. A hollow superconducting cable which can be flattened was introduced for this reason. Each wire in such a cable is formed of a large number of twisted superconducting strands imbedded in a copper or copper alloy matrix. During a flattening process in the fabrication, the copper-clad superconductor passes between rollers so that the top and bottom exterior wire surfaces are slightly flattened, but the adjacent interior surfaces are not flattened by the roller operation. If the cable is flexed or bent, the conductor strands are easily deformed. For larger bore magnets, keystoning the cable was a sufficient means to make up the difference between the inside and outside arc dimensions of the conductor windings. Today, however, because a reduced bore diameter is required, the difference between the arc dimensions would result in a loose, spongy outer surface and the material on the inner arc would be seriously crushed.

SUMMARY OF THE INVENTION

It is therefore an object of this invention to provide a method of fabricating multi-strand superconducting cable which can be flexed and/or bent freely without seriously deforming the conductor strands.

It is another object of the present invention to provide a method of fabricating multi-strand superconducting cable with an increased number of wire strands so that the total current-carrying capability per winding of the cable can be made large.

It is a further object of this invention to provide a method of fabricating multi-strand superconducting cable which can be bent and flexed easily but is stable against collapsing under tension.

It is still a further object of this invention to provide an apparatus for fabricating multi-strand superconducting cable with aforesaid characteristics.

The aforementioned and other objects of this invention are attained by providing a tapered hollow mandrel which is not circular in cross-section but elliptical, or generally in a flat shape so that when a plurality of wires are wound around it, the resultant cable is already flat before a swaging device is applied to further flatten it. Wedge-shaped pieces articulatedly coupled by means of a electrical conductive, and or, add both stability to the cable against collapse and currenty-carrying capability of the cable.

DETAILED DESCRIPTION OF THE INVENTION

Figure 1:
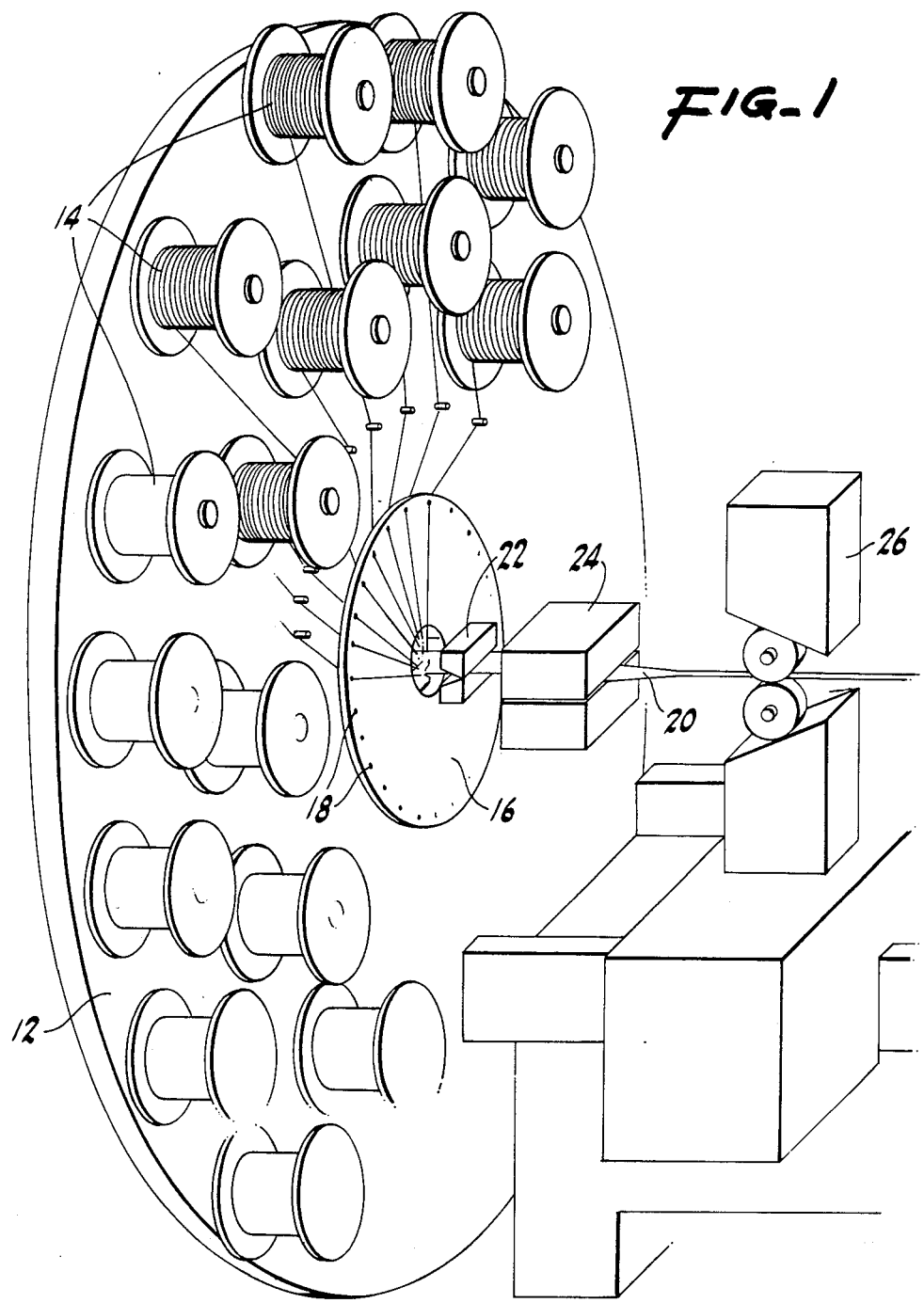
FIG. 1 is a perspective view of an exemplary embodiment of a cable fabricating apparatus according to the present invention.

FIG. 1 shows a perspective view of an apparatus which may be used to fabricate multi-strand cable by a method of the present invention. A ferris wheel-like disk 12 is rotatably mounted on a horizontal axis. On the front surface thereof along its perimeter are a large number of wire spools, each designated generally by the reference numeral 14. For the sake of simplicity, not all of the wire spools are illustrated. In front of the disk 12 and affixed in a coaxial relationship therewith is a circular wire guide means 16 with eyelets 18 along its perimeter. The disk 12 and the wire guide means 16 are adapted to rotate together as a single unit.

An elongate mandrel 20 is disposed along the axis of rotation of the disk 12. The wire guide means 16 is provided with a central opening and the mandrel 20 enters the opening from the back, extending into the forward direction. The individual wire strands from the spools 14 pass through the eyelets 18 and are led radially inward towards the axis of rotation of the disk 12 where they are wound around the mandrel 20 as the disk 12 is rotated.

The mandrel 20 is characterized in that it is tapered, its cross-sectional area becoming smaller as one looks farther away from the disk 12 and that it is flat, unlike the usual round mandrels commonly used for winding superconducting wire. Its cross-sectional shape may be described generally as compound elliptical. The wire strands from the spools 14 are wound diagonally around this mandrel 20.

The mandrel 20 is elongate and extends through a control means 22 to the distal side of a reciprocal swaging device 24 used for flattening the produced cable. Precision sizing devices known in the art such as Turk's head rolls 26, or a group of four idler rolls arranged in a pattern as well as a caterpillar drawing device (not shown) are further disposed in front of the swaging device 24.

According to a fabrication method of the present invention, the wire strands from the spools 14 are wound around the mandrel 20 as explained above. Microswitches (not shown) which are installed on the wire guide means 16 lead the wire strands to the mandrel 20 and interlock the winding mechanism, shutting it off if irregularities are detected in the wire tension. The number of wires and their diameters determine the angle at which the strands wrap around the large end of the mandrel 20. As the wires slide down the mandrel 20, the winding angle changes because the mandrel 20 is tapered, its cross-section and size changing longitudinally. The reciprocal swaging device 24 placed around the mandrel 20 has a trip-hammer type action and forms the cable into a desired shape with all external and internal surfaces flattened. Since the mandrel 20 has a generally flat cross-sectional shape, it can resist excessive deformation and the resulting metal fatigue from the swaging action much better than if it were a cylindrical mandrel.

Figure 2:
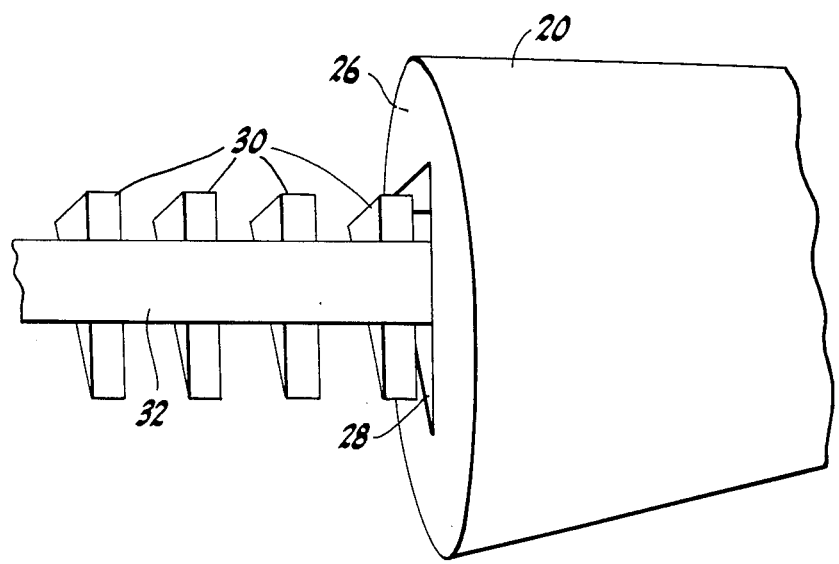
FIG. 2 is a perspective view showing schematically the wider end of a mandrel and supporting pieces being inserted therethrough according to a method of this invention.

The mandrel 20 is hollow, or preferably has a core 26 with a wedge-shaped longitudinal channel 28 as sketched in FIG. 2.

Wedge-shaped supporting pieces made of copper or fabricated from a dielectric material such as fiberglass-reinforced epoxy resin or a relatively non-conductive material such as stainless steel, each designated generally by the reference numeral 30, and coupled by a superconducting ribbon 32 as shown in FIG. 2 are sequentially drawn during the construction process into the conductor cable through the channel 28 in the core 26 in order to shape and stablize the produced cable. When the cable is wound around an object such as a magnet, these added pieces have the effect of more uniformly distributing the force from the object between the inner and outer layers. The wedge dimensions may be varied to satisfy the precise keystone shape required for each particular turn while winding the magnet. Since the wedges 30 are articulated, flexibility is allowed regarding edge-wise bending. They not only support the cable like the teeth on a zipper but also increase the cable's resistance against compression. The superconducting ribbon 32 is adapted to enhance the quench properties of the cable.

The present invention has been described above in terms of only one embodiment but the description given above should be interpreted merely as illustrative. For example, the drawings are generally schematic and do not necessarily present the intended or preferred dimensional or positional relationships of the components. The wire spools 14 need not be affixed to the disk 12 in the way shown in FIG. 1.

The axes of the spools 14 may be rotated and be perpendicular to the axis of rotation of the disk 12. The winding angle of wires around the mandrel 20 is determined by the number of wires, etc. as explained above. An increased number of wire strands comprising the cable is naturally desirable because the total current-carrying capability of the cable can be made larger in a single winding. By adding the wedges 30 to the wire, the number of strands can be increased until the winding angle of the wire on the mandrel 30 approaches 45° which seems to be an optimum value. The principal advantage of the present invention is to introduce a cable that is already wedge-shaped due to the shape of the internal supporting pieces 30 so that the need for wedge-shaped spacers normally inserted between winding turns is obviated. Another advantage attained by the tapered shape of the mandrel according to the present invention is that the mandrel is thereby made easier to be slipped out of position and replaced by another with different dimensions. This can be desirable when the number of wires is reduced while the winding is continued without splicing two cables together with different current-carrying capabilities. In other words, the cable cross-section can be changed for a particular part of the coil, for example, as a magnet is being wound.

In summary the present invention should be broadly interpreted in view of the aforementioned advantages to be attained thereby. The scope of the invention is limited only by the following claims.

What is claimed is:

1. A method of fabricating a multi-strand cable comprising the steps of:
   providing a tapered mandrel which is elongate along a direction transverse to the direction of taper and has a hollow core with a longitudinal wedge-shaped channel extending therethrough.
   winding a plurality of wire strands around said mandrel diagonally with respect to said transverse direction,
   inserting wedge-shaped pieces, articulately coupled together in spaced relationship by a superconducting ribbon means, sequentially through said channel of said mandrel, and
   drawing said wedge-shaped pieces and said plurality of wire strands to form a cable having said wedge-shaped pieces located within said wire strands when said wire strands are drawn from said tapered mandrel.

2. The method of claim 1 wherein said winding step includes the steps of providing a ferris wheel-type rotatable disk, providing wire spools on a surface of said disk along the perimeter thereof, and directing said wire strands radially inwardly from said spools to said mandrel.

3. The method of claim 2 wherein said winding step includes the step of causing said disk to rotate.

4. The method of claim 1 further comprising the step of flattening said wire strands against said mandrel by means of a swaging device.

5. The method of claim 1 for fabricating a multi-strand superconducting cable additionally comprising the steps of; providing flexibly and articulatedly coupled wedge-shaped supporting pieces, and providing a plurality of wire strands wound together around said supporting pieces, having a generally wedge-shaped cross-sectional shape, each of said wire strands having a flattened cross-sectional shape.

6. The method of claim 5 wherein said providing step includes individually attaching said supporting pieces to a superconducting or other ribbon means.

7. The method of claim 1, additionally including the step of forming the plurality of wire strands and the wedge-shaped pieces from material compatible with superconducting applications.

8. In an apparatus for fabricating multi-strand cable, the improvement comprising a ferris wheeltype disk adapted to rotate around an axis, a plurality of spools containing wire affixed on said disk, and a tapered mandrel which is elongate along a direction transverse of the direction of said axis, said mandrel having a core with a wedge-shaped channel extending longitudinally therethrough so that separate, distinct and spaced apart pieces, connected by a superconducting ribbon means, with each of said pieces having a wedge-shaped transverse cross-section, can be continuously passed therethrough.

9. The apparatus of claim 8 further comprising a swaging means disposed around said mandrel.

10. The apparatus of claim 9, wherein said swaging means is of a reciprocating type and includes a trip-hammer type action for forming the cable into a desired shape with flattened external and internal surfaces.

11. The apparatus of claim 8 further comprising a means for drawing a cable.

12. The apparatus of claim 11 wherein said means for drawing a cable include means for drawing said connected pieces through said wedge-shaped channel of said mandrel and for drawing wire wrapped around said mandrel such that said connected pieces are located within said wrapped wire as it is drawn from said mandrel and serves as an internal support for the wrapped wire.

13. The apparatus of claim 8 wherein said disk includes a guiding wheel having eyelets, said guiding wheel being affixed to said disk in coaxial relationship therewith and adapted to rotate together therewith.

14. The apparatus of claim 8, wherein said spools includes a longitudinal axis extending coaxially with said axis of said disk.

* * * * *